United States Patent [19]

Machi et al.

[11] 4,407,846

[45] Oct. 4, 1983

[54] METHOD OF PRODUCING A HYDROPHILIC MEMBRANE FROM A POLYETHYLENE BASE FILM

[75] Inventors: Sueo Machi, Takasaki; Isao Ishigaki, Maebashi; Takanobu Sugo, Gunma; Kazuo Murata; Shiro Tanso, both of Takatsuki; Keizi Senoo, Takasaki, all of Japan

[73] Assignees: Japan Atomic Energy Research Institute, Tokyo; Yuasa Battery Co., Ltd., Osaka, both of Japan

[21] Appl. No.: 311,032

[22] Filed: Oct. 13, 1981

Related U.S. Application Data

[63] Continuation of Ser. No. 118,106, Feb. 4, 1980, abandoned.

[30] Foreign Application Priority Data

Feb. 5, 1979 [JP]  Japan ................................. 54-11983

[51] Int. Cl.³ .............................................. B05D 3/06
[52] U.S. Cl. ................................. 427/35; 204/159.15; 427/44
[58] Field of Search .......................... 427/35, 44, 54.1; 204/159.14, 159.15, 159.2

[56] References Cited

U.S. PATENT DOCUMENTS

| 3,115,418 | 12/1963 | Magat et al. .......................... 427/35 |
| 3,322,661 | 5/1967 | Yoshikawa et al. ........... 204/159.17 |
| 3,427,206 | 2/1969 | Scardaville et al. .................. 427/44 |
| 3,955,014 | 5/1976 | Mostev et al. ..................... 427/54.1 |

*Primary Examiner*—John H. Newsome
*Attorney, Agent, or Firm*—Browdy and Neimark

[57] ABSTRACT

A method of producing a hydrophilic membrane from a polyethylene base film by first irradiating the film with ionizing radiation in air or an oxygen atmosphere and then grafting acrylic acid and/or methacrylic acid onto the irradiated film at low temperatures.

4 Claims, No Drawings

METHOD OF PRODUCING A HYDROPHILIC MEMBRANE FROM A POLYETHYLENE BASE FILM

This is a continuation of application Ser. No. 118,106 filed Feb. 4, 1980, now abandoned.

BACKGROUND OF THE INVENTION

1. Field of the Invention

This invention relates to a method of producing a hydrophilic membrane by grafting acrylic acid and/or methacrylic acid onto an irradiated polyethylene base film. The method is characterized by exposing a polyethylene film having a thickness of 150 μm or lower to ionizing radiation in air to thereby increase greatly the rate of subsequent grafting and provide a hydrophilic membrane having very low electrical resistance.

2. Description of the Prior Art

Grafting onto a polyethylene base film that has been irradiated in vacuum or a nitrogen atmosphere is generally considered to initiate at radicals trapped in the crystalline region of the polyethylene. When such irradiation is effected in air or an oxygen atmosphere, radicals formed by radiation react with oxygen to form hydroperoxide (ROOH) or diperoxide (ROOR), and grafting is considered to initiate at radicals produced by the thermal decomposition of such hydroperoxide and diperoxide. These peroxides are known to be relatively stable and withstand extended storage at room temperature. Grafting to a polyethylene film irradiated in air or an oxygen atmosphere generally requires higher temperature (at least 60° C.) than with a polyethylene film irradiated in an nitrogen atmosphere. It is also known that oxygen does not easily diffuse into the crystalline region of polyethylene and that because of slow diffusion of oxygen into the center region of a thick polyethylene film, the effect of oxygen is not conspicuous in grafting to a polyethylene film that has been irradiated with a high dose rate of radiation such as electron beams.

As a result of studies on grafting to various types of irradiated polymer film, the inventors of this invention have found that grafting to a thin polyethylene film can be carried out at a very high rate without particularly increasing the reaction temperature even if the film has been subjected to irradiation in air and that the resulting membrane of graft polymer has very low electrical resistance.

SUMMARY OF THE INVENTION

Therefore, the primary object of this invention is to provide an economical and efficient method of producing a hydrophilic membrane by grafting acrylic acid and/or methacrylic acid to a polyethylene film, which method comprises irradiating a polyethylene film having a thickness of not more than 150 μm with ionizing radiation in air and then grafting acrylic acid and/or methacrylic acid to the irradiated polyethylene very rapidly at room temperature.

DETAILED DESCRIPTION OF THE INVENTION

It is preferred in the practice of this invention to use a polyethylene base film having a thickness of not more than 150 μm. With a polyethylene film thicker than 150 μm, the effect of irradiation in air is not significant when the source of ionizing radiation is an electron beam accelerator that provides short irradiation at high dose rate. In other words, the grafting rate is not much higher than grafting to a polyethylene film irradiated in nitrogen or vacuum. The polyethylene film may be composed of either high-density or low-density polyethylene. The high-density polyethylene is suitable for the production of a hydrophilic membrane having good mechanical properties, and the low-density polyethylene is suitable for production of a hydrophilic membrane having low electrical resistance.

According to this invention, the polyethylene film is irradiated in air or an oxygen atmosphere to give a total dose of 2 to 30 Mrad at a dose rate in the range of from $5 \times 10^4$ to $10^7$ rad per second. Acrylic acid and/or methacrylic acid is grafted to the thus irradiated polyethylene film by immersing it in an aqueous solution of such monomer. The preferred grafting temperature is in the range of from 10° to 60° C. The monomer concentration is preferably from 10 to 60 wt%.

This invention is now described in greater detail by reference to the following examples which are given here for illustrative purposes only and are by no means intended to limit the scope of the invention.

EXAMPLE 1

A high-density polyethylene (trade name "Suntec", a product of Asahi Chemical Industry Co., Ltd.) having a density of 0.955 was formed by inflation into a polyethylene film 20 μm thick, 8 cm wide and 15 cm long. The film was placed on a conveyor and held in contact with air while being irradiated with electron beams from a resonance variable voltage accelerator (2 MeV, 1 mA) which was passed back and forth over the film at a rate of $1 \times 10^6$ rad per pass to give a total dose of 30 Mrad. The thus irradiated polyethylene film was placed in a glass ampule which was evacuated to $10^{-4}$ mmHg. The ampule under vacuum was filled with a monomer solution containing 50 wt% aqueous acrylic acid and 0.25% of Mohr's salt and which had the oxygen content reduced to less than 0.1 ppm. After one hour of grafting in a constant temperature bath (25° C.), the resulting membrane of graft polymer was washed with water to completely eliminate the unreacted and homopolymerized monomer. Following drying, a membrane having a degree of graft of 125% was obtained. The degree of graft was determined from the increase in the weight of the membrane over that of the polyethylene film. Such membrane was heated at 90° C. in 2.5% aqueous caustic potash for 2 hours and then immersed in 40% aqueous caustic potash for 24 hours. The alkali-treated membrane as found to have an electrical resistance of 45 milli-ohms per square centimeter as measured at 1000 Hz A.C.

As a control, a polyethylene film of the same nature and size as defined above was placed in a nitrogen-filled polyethylene bag and subjected to irradiation and grafting in the same manner as described above. A membrane (degree of graft: 30%) obtained by 1-hour grafting was found to have an electrical resistance of at least $1 \times 10^3$ ohms per square centimeter. A membrane (degree of graft: 128%) obtained by 3-hour grafting had an electrical resistance of 60 milli-ohms per square centimeter.

EXAMPLE 2

A membrane of graft polymer (degree of graft: 100%) was prepared by repeating the procedure of irradiation and grafting of Example 1 except that the total radiation dose was 5 Mrad and the grafting period was 5 hours. The membrane had an electrical resistance of 70 milli-ohms per square centimeter.

As a control, a polyethylene film of the same nature and size was placed in a nitrogen-filled polyethylene bag, subjected to 5 Mrad's irradiation and grafting for 5 hours. The obtained degree of graft was 80% which did not increase even if the grafting period was extended. The control membrane had an electrical resistance of 120 milli-ohms per square centimeter.

EXAMPLE 3

A membrane of graft polymer (degree of graft: 150%) was prepared from a polyethylene film of the same nature and size as used in Example 1 by repeating the procedure of irradiation and grafting of Example 1 except that the monomer solution consisted of 20 wt% aqueous methacrylic acid and 0.25% of Mohr's salt. The resulting membrane had an electrical resistance of 100 milli-ohms per square centimeter.

EXAMPLE 4

A low-density polyethylene (a product of Asahi-Dow Co., Ltd.) having a density of 0.921 was formed by inflation into a polyethylene base film 100 μm thick. The film was subjected to the procedure of irradiation and grafting of Example 1 except that the grafting period was 3 hours. A membrane of graft polymer (degree of graft: 95%) was obtained and it had an electrical resistance of 205 milli-ohms per square centimeter.

As a control, polyethylene film of the same nature and size was placed in a nitrogen-filled polyethylene bag, subjected to irradiation and grafting for 3 hours. The obtained membrane had a degree of graft of 55% and an electrical resistance of 435 milli-ohms per square centimeter.

What is claimed is:

1. A method of producing a hydrophylic membrane from a polyethylene base film by first irradiating the film of thickness not more than 150 μm with ionizing radiation in air or an oxygen atmosphere to give a total dose of 2 to 30 Mrad at a dose rate of $5 \times 10^4$ to $10^7$ rad/sec, and then grafting without additional radiation acrylic acid and/or methacrylic acid present in the form of a 10–60 wt% aqueous solution onto the irradiated film at a temperature of 10° C. to 60° C.

2. A method according to claim 1 wherein the aqueous solution of acrylic acid and/or methacrylic acid has the oxygen content thereof reduced to less than 0.1 ppm.

3. A method according to claim 1 wherein the degree of graft is at least 95%.

4. A method according to claim 1, wherein said temperature is no more than about 25° C.

* * * * *